United States Patent
Fu

(10) Patent No.: US 12,550,011 B2
(45) Date of Patent: Feb. 10, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 529 days.

(21) Appl. No.: 18/089,490

(22) Filed: Dec. 27, 2022

(65) Prior Publication Data

US 2023/0209416 A1 Jun. 29, 2023

Related U.S. Application Data

(63) Continuation of application No. PCT/CN2020/109883, filed on Aug. 18, 2020.

(51) Int. Cl.
*H04W 36/00* (2009.01)
*H04W 36/06* (2009.01)
(Continued)

(52) U.S. Cl.
CPC ....... *H04W 36/0055* (2013.01); *H04W 36/06* (2013.01); *H04W 36/24* (2013.01); *H04W 36/28* (2013.01)

(58) Field of Classification Search
CPC . H04W 36/0055; H04W 36/06; H04W 36/24; H04W 36/28; H04W 36/13;
(Continued)

(56) References Cited

U.S. PATENT DOCUMENTS

2017/0367120 A1\* 12/2017 Murray ............... H04W 72/046
2019/0268840 A1\* 8/2019 Chen .................... H04W 36/00
(Continued)

FOREIGN PATENT DOCUMENTS

| CN | 102170641 A | 8/2011 |
|---|---|---|
| CN | 102170671 A | 8/2011 |

(Continued)

OTHER PUBLICATIONS

Notice of Allowance issued in corresponding European Application No. 20949780.9, mailed Oct. 17, 2024, 58 pages.
(Continued)

*Primary Examiner* — Sujoy K Kundu
*Assistant Examiner* — Vladislav Y Agureyev
(74) *Attorney, Agent, or Firm* — BAYES PLLC

(57) ABSTRACT

Embodiments of the present application provide a wireless communication method, a terminal device, and a network device. The method includes: obtaining, by a terminal device, indication information, the indication information being used to indicate information of an intended slice; and according to the information of the intended slice, performing, by the terminal device, cell reselection or determining whether to trigger a connection establishment procedure in a serving cell of the terminal device.

8 Claims, 5 Drawing Sheets

(51) Int. Cl.
*H04W 36/24* (2009.01)
*H04W 36/28* (2009.01)

(58) Field of Classification Search
CPC . H04W 36/0069; H04W 36/08; H04W 36/14; H04W 36/34; H04W 48/20; H04W 48/18; H04W 68/005; H04W 68/02; H04W 8/24; H04W 76/15; H04W 76/50; H04W 72/23; H04L 5/0053; H04L 5/001
See application file for complete search history.

(56) References Cited

U.S. PATENT DOCUMENTS

| | | | |
|---|---|---|---|
| 2019/0349774 A1* | 11/2019 | Lou | H04W 36/13 |
| 2020/0022095 A1* | 1/2020 | Kim | H04W 8/08 |
| 2020/0059987 A1* | 2/2020 | Hong | H04W 36/0033 |
| 2020/0120547 A1* | 4/2020 | Han | H04W 36/0083 |
| 2020/0344679 A1* | 10/2020 | Jin | H04L 69/322 |
| 2020/0374181 A1* | 11/2020 | Stenberg | H04W 48/18 |
| 2021/0022200 A1* | 1/2021 | Mildh | H04W 60/02 |
| 2023/0026697 A1* | 1/2023 | Li | H04W 48/14 |
| 2023/0292202 A1* | 9/2023 | Jung | H04W 48/16 |

FOREIGN PATENT DOCUMENTS

| | | | | |
|---|---|---|---|---|
| CN | 102202370 A * | 9/2011 | | |
| CN | 107223350 A | 9/2017 | | |
| CN | 107295609 A | 10/2017 | | |
| CN | 109246775 A | 1/2019 | | |
| CN | 109936861 A | 6/2019 | | |
| CN | 110035461 A | 7/2019 | | |
| CN | 110226337 A | 9/2019 | | |
| CN | 110248353 A | 9/2019 | | |
| CN | 112449387 A * | 3/2021 | | H04W 36/08 |
| CN | 113498121 A * | 10/2021 | | H04W 60/00 |
| EP | 3537760 A1 | 9/2019 | | |
| EP | 3573375 A1 | 11/2019 | | |
| EP | 3589064 A1 * | 1/2020 | | H04W 76/20 |
| EP | 4255035 A2 * | 10/2023 | | H04W 48/12 |
| KR | 20220017755 A * | 2/2022 | | H04W 36/0011 |
| WO | 2012163115 A1 | 12/2012 | | |
| WO | WO-2018228294 A1 * | 12/2018 | | H04W 48/20 |
| WO | 2019064274 A1 | 4/2019 | | |
| WO | WO-2022027166 A1 * | 2/2022 | | H04W 48/12 |

OTHER PUBLICATIONS

Second Examination Opinion Notice issued in corresponding Chinese Application No. 202310494085.2, mailed Dec. 17, 2024, 14 pages.
Third Office Action issued in corresponding Chinese Application No. 202310494085.2, dated Feb. 21, 2025, 17 pages.
Consideration on the scope and solutions for RAN slicing enhancement, Source: ZTE Corporation, Sanechips, Agenda item: 8.8, 3GPP TSG-RAN WG2 Meeting#111, R2-2006871, Electronic, Aug. 17-28, 2020, 7 pages.
Initial Discussion on the Scope and Requirements for Slicing, Source: CATT, Agenda Item: 8.8, 3GPP TSG-RAN WG2 Meeting #111 electronic R2-2006632, Online, Aug. 17-28, 2020, 5 pages.
Methods for serving slices on different frequencies, Source: Ericsson, Agenda Item: 8.8, 3GPP TSG-RAN WG2 #111e Tdoc R2-2007645, Electronic meeting, Aug. 17-28, 2020, 8 pages.
3GPP TS 38.331 V16.0.0 (Mar. 2020); Technical Specification Group Radio Access Network; NR; Radio Resource Control (RRC) protocol specification (Release 16).
3GPP TS 23.501 V17.5.0 (Jun. 2022); Technical Specification Group Services and System Aspects; System architecture for the 5G System (5GS); Stage 2 (Release 17).
3GPP TS 24.501 V17.7.1 (Jun. 2022); Technical Specification Group Core Network and Terminals; Non-Access-Stratum (NAS) protocol for 5G System (5GS); Stage 3 (Release 17).
3GPP TS 38.300 V17.1.0 (Jun. 2022); Technical Specification Group Radio Access Network; NR; NR and NG-RAN Overall Description; Stage 2 (Release 17).
3GPP TS 38.304 V17.1.0 (Jun. 2022); Technical Specification Group Radio Access Network; NR; User Equipment (UE) procedures in Idle mode and RRC Inactive state (Release 17).
Qualcomm Incorporated, "Discussion on RAN slicing enhancement", R2-2006767, 3GPP TSG RAN WG2 Meeting #111-e Electronic, Aug. 17-28, 2020.
Intel Corporation, "Slicing based cell (re)selection", R2-2006951, 3GPP TSG RAN WG2 Meeting #111e E-Meeting, Aug. 17-28, 2020.
Samsung et al., "Key Issue on 5GC assisted cell selection to access network slice", S2-2001467, SA WG2 Meeting #136 Ad-hoc Jan. 13-17, 2020, Incheon, Korea.
International Search Report issued in International application No. PCT/CN2020/109883, mailed May 11, 2021.
Written Opinion of the International Searching Authority issued in International application No. PCT/CN2020/109883, mailed May 11, 2021.
Notice of Priority Examination of Patent Application issued in corresponding Chinese Application No. 202310494085.2, mailed Jul. 31, 2024, 6 pages.
First Office Opinion Notice issued in corresponding Chinese Application No. 202310494085.2, mailed Aug. 20, 2024, 6 pages.
Notice of Reasons for Refusal issued in corresponding Japanese Application No. 2023-511870, mailed Aug. 30, 2024, 9 pages.
"Enhancement on RAN support of network slicing", Agenda Item: 8.8, Source: Xiaomi, 3GPP TSG-RAN2 #111e,, R2-2007521, Online, Aug. 17-28, 2020, 4 pages.
First Office Action issued in corresponding Indian application No. 202327018261, mailed Sep. 26, 2023.
Extended European Search Report issued in corresponding European application No. 20949780.9, mailed Sep. 12, 2023.
3GPP TSG-RAN WG2 Meeting #111 electronic; R2-2007609; Online, Aug. 17-28, 2020 Source: Convida Wireless; Title: Discussion on Network Slicing's Impact on Cell Reselection.
3GPP TSG-RAN3 #101bis; R3-185962; Chengdu, China, Oct. 8-12, 2018 Title: UE Interested S-NSSAI; Source: Qualcomm Incorporated, T-Mobile USA, CATT.
3GPP TSG RAN WG2 Meeting #111-e; R2-2006883; Electronic, Aug. 17-28, 2020 Source: Lenovo, Motorola Mobility; Title: Considerations on scope of RAN slicing enhancements.
First Office Action issued in corresponding European application No. 20949780.9, mailed Mar. 14, 2024.

* cited by examiner

WIRELESS COMMUNICATION METHOD, TERMINAL DEVICE, AND NETWORK DEVICE

CROSS-REFERENCE TO RELATED APPLICATION

The present application is a continuation of International Application No. PCT/CN2020/109883 filed on Aug. 18, 2020, which is incorporated herein by reference in its entirety.

TECHNICAL FIELD

Embodiments of the present disclosure relate to the communication technical field, and more specifically, to a wireless communication method, a terminal device and a network device.

BACKGROUND

The demand for wireless communications in vertical industries is clear to all. To meet the needs of vertical industries in terms of latency, mobility, reliability, and location accuracy, a Radio Access Network (RAN) needs to be enhanced on how to support vertical services in the access network. One way is to provide services with lower latency, more targeting, greater flexibility and higher scalability for multiple services with different requirements through slicing or network slicing.

In a case where a terminal device is currently configured with a slice, when the terminal device obtains information of an intended slice, how the terminal device performs processes is an urgent technical problem to be solved in the present disclosure.

SUMMARY

Embodiments of the present disclosure provide a wireless communication method, a terminal device and a network device, which provide a processing method for a terminal device when the terminal device obtains information of an intended slice in a case where the terminal device is currently configured with a slice.

According to a first aspect, there is provided wireless communication method, including: obtaining, by a terminal device, indication information, wherein the indication information is used to indicate information of an intended slice; and according to the information of the intended slice, performing, by the terminal device, cell reselection or determining whether to trigger a connection establishment procedure in a serving cell of the terminal device.

According to a second aspect, there is provided a wireless communication method, including: obtaining, by a terminal device, indication information, wherein the indication information is used to indicate information of an intended slice; and sending, by the terminal device, the indication information to a network device.

According to a third aspect, there is provided a wireless communication method, including: receiving, by a network device, indication information, wherein the indication information is used to indicate information of an intended slice; according to the information of the intended slice, determining and/or sending, by the network device, at least one of the following: a first indication of whether the intended slice is supported by a serving cell of a terminal device; a DC configuration corresponding to the intended slice; an activation or de-activation indication for the DC corresponding to the intended slice; a CA configuration corresponding to the intended slice; an activation or de-activation indication for the CA corresponding to the intended slice; a second indication that the terminal device is required to perform a cell handover; and a third indication that the terminal device is required to perform a cell redirection.

According to a fourth aspect, there is provided a terminal device configured to perform the method according to the first aspect or respective implementations of the first aspect.

Specifically, the terminal device includes functional module(s) configured to perform the method according to the first aspect or respective implementations of the first aspect.

According to a fifth aspect, there is provided a terminal device configured to perform the method according to the second aspect or respective implementations of the second aspect.

Specifically, the terminal device includes functional module(s) configured to perform the method according to the second aspect or respective implementations of the second aspect.

According to a sixth aspect, there is provided a network device configured to perform the method according to the third aspect or respective implementations of the third aspect.

Specifically, the network device includes functional module(s) configured to perform the method according to the third aspect or respective implementations of the third aspect.

According to a seventh aspect, there is provided a terminal device including: a processor and a memory, wherein the memory is used to store a computer program, and the processor is configured to call and run the computer program stored in the memory to perform the method according to the first aspect or respective implementations of the first aspect.

According to an eighth aspect, there is provided a terminal device including: a processor and a memory, wherein the memory is used to store a computer program, and the processor is configured to call and run the computer program stored in the memory to perform the method according to the second aspect or respective implementations of the second aspect.

According to a ninth aspect, there is provided a network device including: a processor and a memory, wherein the memory is used to store a computer program, and the processor is configured to call and run the computer program stored in the memory to perform the method according to the third aspect or respective implementations of the third aspect.

According to a tenth aspect, there is provided an apparatus configured to perform the method according to any one of the first to third aspects or respective implementations of any one of the first to third aspects.

Specifically, the apparatus includes a processor configured to call and run a computer program from a memory to cause a device in which the apparatus is installed to perform the method according to any one of the first to third aspects or respective implementations of any one of the first to third aspects.

According to an eleventh aspect, there is provided a computer-readable storage medium having a computer program stored thereon, wherein the computer program causes a computer to perform the method according to any one of the first to third aspects or respective implementations of any one of the first to third aspects.

According to a twelfth aspect, there is provided a computer program product including computer program instructions which cause a computer to perform the method according to any one of the first to third aspects or respective implementations of any one of the first to third aspects.

According to a thirteenth aspect, there is provided a computer program. When the computer program runs on a computer, the computer is caused to perform method according to any one of the first to third aspects or respective implementations of any one of the first to third aspects.

The above technical solution according to any one of the first to third aspects provides a processing method for the terminal device when the terminal device obtains the information of the intended slice in a case where the terminal device is currently configured with a slice. The terminal device may perform cell reselection or determine whether to trigger a connection establishment procedure in the serving cell of the terminal device according to the information of the intended slice. Accordingly, the service transmission or cell residency corresponding to the intended slice may be ensured. Or, the network device may determine and/or send at least one of the following based on the information about the intended slice indicated by the indication message: a first indication of whether the intended slice is supported by the serving cell of the terminal device; a DC configuration corresponding to the intended slice; an activation or de-activation indication for the DC corresponding to the intended slice; a CA configuration corresponding to the intended slice; an activation or de-activation indication for the CA corresponding to the intended slice; a second indication that the terminal device is required to perform a cell handover; and a third indication that the terminal device is required to perform a cell redirection. In this way, the service transmission corresponding to the intended slice can be ensured.

DETAILED DESCRIPTION

The technical solutions in embodiments of the present disclosure will be described below with reference to the drawings in the embodiments of the present disclosure. Obviously, the described embodiments are part of the embodiments of the present disclosure, but not all of the embodiments. All other embodiments obtained by those of ordinary skill in the art based on the embodiments of described herein without creative work fall within the scope of protection of the present disclosure.

Embodiments of the present disclosure may be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR), evolution system of NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), a next generation communication system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), and Vehicle to Vehicle (V2V) communications, etc. Embodiments of the present disclosure may be applied to these communications systems.

Optionally, the communication systems in embodiments of the present disclosure may be applied to a Carrier Aggregation (CA) scenario, may also be applied to a Dual Connectivity (DC) scenario, and may also be applied to a standalone (SA) network deployment scenario.

The communication system spectrum which embodiments of the present disclosure may be applied is not limited. For example, embodiments of the present disclosure may be applied to licensed spectrum or unlicensed spectrum.

Figure 1:
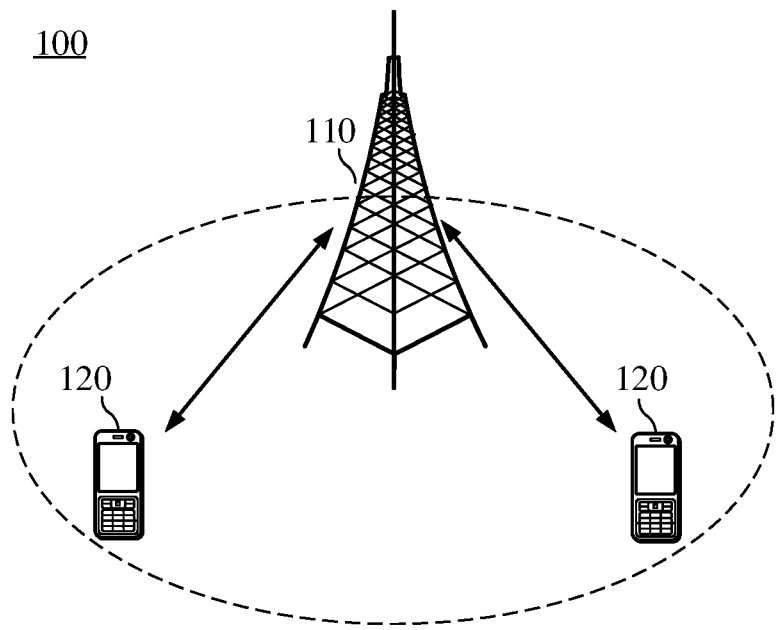
FIG. 1 is a schematic diagram of a communication system architecture according to an embodiment of the present disclosure.

Exemplarily, a communication system 100 to which embodiments of the present disclosure may be applied is shown in FIG. 1. The communication system 100 may include a network device 110. The network device 110 may be a device that communicates with a terminal device 120 (or referred to as a communication terminal, or a terminal). The network device 110 may provide communication coverage for a particular geographic area and may communicate with terminal devices within the coverage area.

FIG. 1 exemplarily shows one network device and two terminal devices. According to some embodiments, the communication system 100 may include multiple network devices and the coverage of each network device may include other numbers of terminal devices, and embodiments of the present disclosure do not impose specific limitations on this.

According to some embodiments, the communication system 100 may further include other network entities such as a network controller, or a mobility management entity, which are not limited in embodiments of the present disclosure.

It should be understood that a device having a communication function in the network/system in embodiments of the present disclosure may be referred to as a communication device. Taking the communication system 100 shown in FIG. 1 as an example, the communication device may include a network device 110 and terminal devices 120 with a communication function, and the network device 110 and the terminal devices 120 may be the specific devices described above, which will not be repeated here. The communication device may further include other devices in the communication system 100, such as other network entities like a network controller or a mobility management entity, which are not limited in embodiments of the present disclosure.

It should be understood that the terms "system" and "network" are often used interchangeably herein. The term "and/or" herein is only an association relationship to describe associated objects, indicating that there may be three kinds of relationships, for example, A and/or B can mean three cases: A alone, B alone, and A and B together. In addition, the character "/" herein generally indicates that the related objects are in an "or" relationship.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

By way of example and not limitation, in embodiments of the present disclosure, the terminal device may also be a wearable device. The wearable device may also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB), or a relay station or an access point, or a vehicle-mounted device, a wearable device, a network device or base station (gNB) in an NR network, or a network device in future evolved PLMN network.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

Before presenting the technical solutions of the present disclosure, the following describes cell reselection and paging.

(1) Cell Reselection:

In the procedure of cell selection and reselection performed by the terminal device in a non-connected state (i.e., an idle state or an inactive state), a cell reselection policy based on frequency priority is defined to meet the load balancing in the idle state.

Cell reselection refers to the procedure of selecting a best cell to provide service signal(s) by monitoring the signal quality of a neighboring cell and the current serving cell in the non-connected state. When the signal quality and level of the neighboring cell meet a S criterion to meet a certain reselection criterion, the terminal device will access the cell to camp on the cell.

After the terminal device successfully camps on the cell, the terminal device will continuously perform measurement on the cell. The terminal device calculates Srxlev (i.e., S criterion) at the Radio Resource Control (RRC) layer according to the Reference Signal Received Power (RSRP) measurement result and compares it with Sintrasearch (i.e., intra-frequency measurement start threshold) and Snonintrasearch (i.e., inter-frequency/inter-system measurement start threshold) as a judgment condition for whether to initiate neighboring cell measurement.

For intra-frequency or equal priority inter-frequency cell reselection, a R criterion is used for cell reselection, i.e., cells are ranked according to their signal qualities and a cell with the best signal quality is selected as the candidate target cell for reselection. For a cell with a high frequency priority, as long as the cell signal quality meets a certain threshold, the cell with the high frequency priority is reselected. For a cell with a low frequency priority, the cell is reselected only when the signal quality of the serving cell is below a certain threshold.

(2) Paging:

Paging is initiated by a network device to a terminal device in the idle state or in the inactive stage or in the connected state. Paging is divided into a Core Network (CN)-initiated paging massage and a Radio Access Network (RAN)-initiated paging message.

CN-initiated paging: paging is initiated within the scope of a registered Tracking Area (TA) list to notify the terminal device to receive a paging message.

RAN-initiated paging: a paging message is initiated within a RAN range to notify the terminal device to receive a paging message.

Network device-triggered paging: paging is initiated within a cell range to notify a change of system information and notify the terminal device to receive an Earthquake and Tsunami Warning System (ETWS) message, and so on. In this case, Downlink Control Information (DCI) carries a system information change indication and a Public Warning System (PWS) notification indication.

A paging message is carried on a Paging Control Channel (PCH), a Paging Channel (PCH), or a Physical Downlink Shared Channel (PDSCH), and is scheduled for transmission through a Physical Downlink Control Channel (PDCCH). The Paging-Radio Network Temporary Identifier (P-RNTI) takes a fixed value of FFFE and is used to scramble the DCI for the paging message. When there is paging, the network device will send a PDCCH grant on the PDCCH at a calculated paging occasion. If the P-RNTI is monitored by the terminal device at the paging occasion, the terminal device will receive the paging message on a designated time-frequency resource.

It should be noted that the idle state in the present disclosure is also described as RRC idle state (RRC_IDLE), the inactive state is also described as RRC inactive state (RRC_INACTIVE), and the connected state is also described as RRC connected state (RRC_CONNECTED). A Paging Message Contains:

Identity of a paged terminal device: this identity is Serving-Temporary Mobile Subscriber Identity (S-TMSI) for CN-initiated paging, and this identity is System Information-Temporary Mobile Subscriber Identity (SI-TMSI) for RAN-initiated paging. International Mobile Subscriber Identity (IMSI)/Subscription Permanent Identifier (SUPI)/Subscription Concealed Identifier (SUCI) is not supported for paging a terminal device. Up to 32 terminal devices may be paged at the same time.

Access type of the triggered paging: 3rd Generation Partnership Project (3GPP) or non-3GPP. An indication for indicating an access network technology, to which a Packet Data Unit (PDU) session belongs, needs to be submitted to a higher layer.

Different RRC states have different requirements for the reception of a paging message.

Cell default DRX cycle: this is a cell level DRX broadcast by the cell system.

Terminal device specific DRX (UE specific DRX): this is a DRX determined by the terminal device, is sent to the CN side through a Non-Access Stratum (NAS) message, and is sent to the network device by the CN side when paging is performed.

RAN DRX: when the network side decides to let a terminal device enter into the inactive state, the RAN DRX is configured to the terminal device through an RRC release (Release) message.

A terminal device and a network side use a minimum the principle to select a DRX for paging occasion calculation. For RRC_IDLE UE, the smallest DRX among Cell default DRX cycle and UE specific DRX is used. For RRC_INACTIVE UE, the smallest DRX among Cell default DRX cycle, UE specific DRX and RAN DRX is used.

The following is a detailed description for the technical solutions of the present disclosure.

Figure 2:
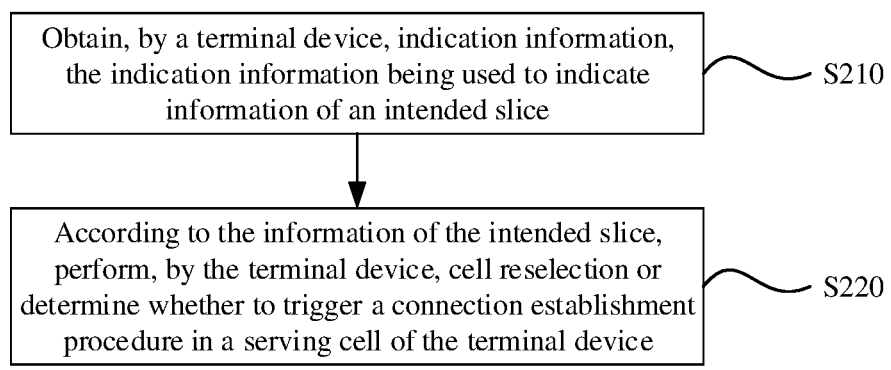
FIG. 2 is a flow diagram of a wireless communication method according to an embodiment of the present disclosure.

FIG. 2 is a flowchart of a wireless communication method according to an embodiment of the present disclosure. The method includes the following steps.

In step S210, a terminal device obtains indication information. The indication information is used to indicate information of an intended slice.

In step S220, according to the information of the intended slice, the terminal device performs cell reselection or determines whether to trigger a connection establishment procedure in a serving cell of the terminal device.

Optionally, this embodiment is applicable to a scenario where the terminal device is in a non-connected state, but is

| RRC state | requirements for the reception of a paging message |
| --- | --- |
| RRC_IDLE | System information change paging: in this case, the paging message is triggered by the network device, the network device does not have a terminal device specific Discontinuous Reception (DRX), and paging is only for terminal devices in the whole cell. Thus, the network device at this time sends the system information change paging at all possible paging subframe(s) in a modification period. A terminal device monitors a paging message in its own paging subframe.<br>CN-initiated called paging: the paging in this case is triggered by the Access and Mobility Management Function (AMF). The AMF sends a paging message to the network device, which sends the paging message to a terminal device at a paging occasion for the terminal device. The terminal device monitors paging in its own paging subframe. |
| RRC_CONNECTED | System information change: the terminal device no longer uses the paging occasion in the IDLE state, and the terminal device wakes up in a specific DRX, and monitors paging in any paging subframe during the modification period. |
| RRC_INACTIVE | System information change paging: the network device still sends paging according to the above rule.<br>CN-initiated called paging: this is an abnormal scenario where the network device does not have the context of a terminal device. After receiving the paging, the terminal device returns to the idle state and initiates RRC connection establishment.<br>RAN-initiated called paging: after receiving the paging, the terminal device initiates the RRC connection resume procedure. |

A terminal device receives a paging message at its own paging occasion in the RRC_IDLE and RRC_INACTIVE states. The terminal device does not need to monitor PDCCH all the time, but only needs to monitor the PDCCH at a paging occasion to achieve the purpose of power saving on the terminal device side. The calculation of the paging occasion is based on DRX, and the magnitude of DRX determines the balance between power saving and access delay of the terminal device. There are three DRXs used to calculate the paging occasion for the terminal device:

not limited thereto. When the terminal device is in the non-connected state, the network device may broadcast information of at least one slice supported by the network device via a system message.

Optionally, the information of at least one slice supported by the network device includes, but is not limited to, at least one of the following: an identity of the at least one slice supported by the network device, a priority of the at least one slice, information of a frequency point corresponding to the at least one slice, and information of a cell corresponding to the at least one slice.

Optionally, the at least one slice supported by the network device may be at least one slice supported by a cell covered by the network device, or may be at least one slice supported by a cell other than the cell covered by the network device.

Optionally, the network device may configure a slice for the terminal device according to the information of at least one slice it supports. The configured slice may be any one of the at least one slice supported by the network device.

It should be understood that the above configured slice is also described as a currently configured slice, a current serving slice, a currently established slice, or a currently allowed slice.

Optionally, the terminal device may select a cell corresponding to the configured slice to camp on.

It should be understood that the information of the intended slice is also described as information of a required slice, or information of a required slice of the terminal device, or information of a slice required by the terminal device, and embodiments of the present disclosure do not impose specific limitations on this.

Optionally, the information of the intended slice includes, but is not limited to, at least one of the following: an identity of the intended slice, a priority of the intended slice, information of a frequency point corresponding to the intended slice, and information of a cell corresponding to the intended slice.

Optionally, the identity of the intended slice may be Single Network Slice Selection Assistance Information (S-NSSAI) or Network Slice Selection Assistance Information (NSSAI), which is not limited by the present disclosure.

It should be understood that a slice corresponds to a cell one by one. Therefore, the information of the frequency point corresponding to the intended slice is also described as the frequency point information of a cell corresponding to the intended slice.

Optionally, the information of the frequency point includes, but is not limited to, the following information: an identity of the frequency point and/or a priority of the frequency point.

Optionally, the information of the cell corresponding to the intended slice includes, but is not limited to, the following information: an identity of the cell corresponding to the intended slice, a priority of the cell, frequency point information of the cell, or bandwidth information of the cell.

Optionally, when the terminal device is in the non-connected state, the terminal device may obtain the indication information by, but not limited to, the following manners.

1. The indication information is generated by a Non-Access Stratum (NAS) of the terminal device and sent to an Access Stratum (AS) of the terminal device.

2. The indication information is sent by the core network device to the terminal device via a NAS message.

3. The indication information is sent by the network device to the terminal device, for example, the indication information is carried in a paging message.

Optionally, the core network device may send a paging message to the network device when the core network is called, or data push is performed. Further, the network device may send the paging message to the terminal device.

Optionally, the core network device is an Access and Mobility Management Function (AMF), but the present disclosure is not limited thereto.

Optionally, the indication information is sent during a service request procedure, a PDU session establishment request procedure, a paging procedure, or a PDU session modification request procedure. Alternatively, the indication information is sent when a service arrives.

Optionally, the service may be a paging service or other data service, etc., and embodiments of the present disclosure do not impose specific limitations on this.

Optionally, for a case where the indication information is sent to the AS by the NAS of the terminal device, the NAS of the terminal device may send the indication information to the AS in any case, or may send the indication information when a certain condition is met.

Optionally, for a case where the indication information is sent from the core network device to the terminal device via the NAS, the core network device may send the indication information to the terminal device in any case, or may send the indication information when a certain condition is met.

Optionally, for a case where the indication information is sent from the network device to the terminal device, the access network device may send the indication information to the terminal device in any case, or may send the indication information when a certain condition is met.

Optionally, the above condition may be that the priority of the intended slice is higher than the priority of the currently configured, the current serving, or currently established slice of the terminal device. Alternatively, the condition may be that the priority of the intended slice is not lower than the priority of the currently configured, the current serving, or currently established slice of the terminal device.

Optionally, the indication information may be carried in a cause value.

Optionally, the cause values are any of, but not limited to, the following: a RRC Establishment Cause, a RRC Reestablishment Cause, or a Cell Resume Cause.

It should be noted that, in addition to obtaining the information of the intended slice through the indication information, the information of the intended slice may also be pre-configured by the network device to the terminal device, which is not limited in the present disclosure.

Optionally, as mentioned above, the terminal device may select a cell corresponding to the configured slice to camp on. After the terminal device obtains the information of the intended slice, if the terminal device is not performing the cell reselection procedure, the terminal device may directly perform cell reselection. If the terminal device is performing the cell reselection procedure, the terminal device interrupts the current cell reselection procedure, and further, the terminal device performs cell reselection according to the information of the intended slice.

Optionally, for a case where the indication information is sent from the NAS of the terminal device to the AS, and the NAS of the terminal device uses the indication information only for the purpose of updating the information of the intended slice but not for triggering service transmission or PDU session establishment, the terminal device may perform cell reselection according to the information of the intended slice.

Optionally, for a case where the indication information is sent from the NAS of the terminal device to the AS, and the NAS of the terminal device uses the indication information for the purpose of triggering service transmission or PDU session establishment, the terminal device may trigger a connection establishment procedure in a reselected cell after the cell reselection is performed according to the information of the intended slice.

Optionally, for a case where the indication information is sent from the core network device to the terminal device via the NAS or the indication information is sent from the core network device to the terminal device, the terminal device may also trigger the connection establishment procedure in the reselected cell after the cell reselection is performed according to the information of the intended slice.

Optionally, for a case where the indication information is sent from the network device to the terminal device, the terminal device may also trigger the connection establishment procedure in the reselected cell after the cell reselection is performed according to the information of the intended slice.

Optionally, the above connection establishment procedure includes but is not limited to: a RRC connection establishment procedure, or a PDU session establishment procedure.

Optionally, if the terminal device determines that a cell corresponding to the intended slice is the serving cell according to the information of the intended slice, the terminal device determines to trigger the connection establishment procedure in the serving cell of the terminal device. If the terminal device determines that the cell corresponding to the intended slice is not the serving cell according to the information of the intended slice, the terminal device determines not to trigger the connection establishment procedure in the serving cell of the terminal device. If the terminal device determines that the cell corresponding to the intended slice is not the serving cell according to the information of the intended slice, the terminal device determines to trigger the connection establishment procedure in the serving cell of the terminal device, but only emergency service transmission is supported.

Optionally, when the terminal device obtains the information of the intended slice, the terminal device may directly perform cell reselection or determine whether to trigger the connection establishment procedure in the serving cell of the terminal device according to the information of the intended slice. Alternatively, after the terminal device obtains the information of the intended slice, the terminal device performs cell reselection or determines whether to trigger the connection establishment procedure in the serving cell of the terminal device if the terminal device determines that the following condition is met.

Optionally, the condition include but is not limited to that: the serving cell of the terminal device or the frequency point of the serving cell cannot support both the current service of the terminal device and the service corresponding to the intended slice; and/or, the priority of the service corresponding to the intended slice is higher than the priority of the current service; and/or, the priority of the intended slice is not lower than the priority of the currently configured slice, the current serving slice or the currently established slice of the terminal device.

In summary, embodiments of the present disclosure provide a processing method of the terminal device when the terminal device obtains the information of the intended slice in the case where the terminal device in the non-connected state is currently configured with a slice. That is, the terminal device can perform cell reselection or determine whether to trigger the connection establishment procedure in the serving cell of the terminal device according to the information of the intended slice. Further, in the embodiments of the present disclosure, the terminal device can perform cell reselection or determine whether to trigger the connection establishment procedure in the serving cell of the terminal device according to the information of the intended slice, and thus the service transmission or cell residency corresponding to the intended slice can be ensured.

Figure 3:
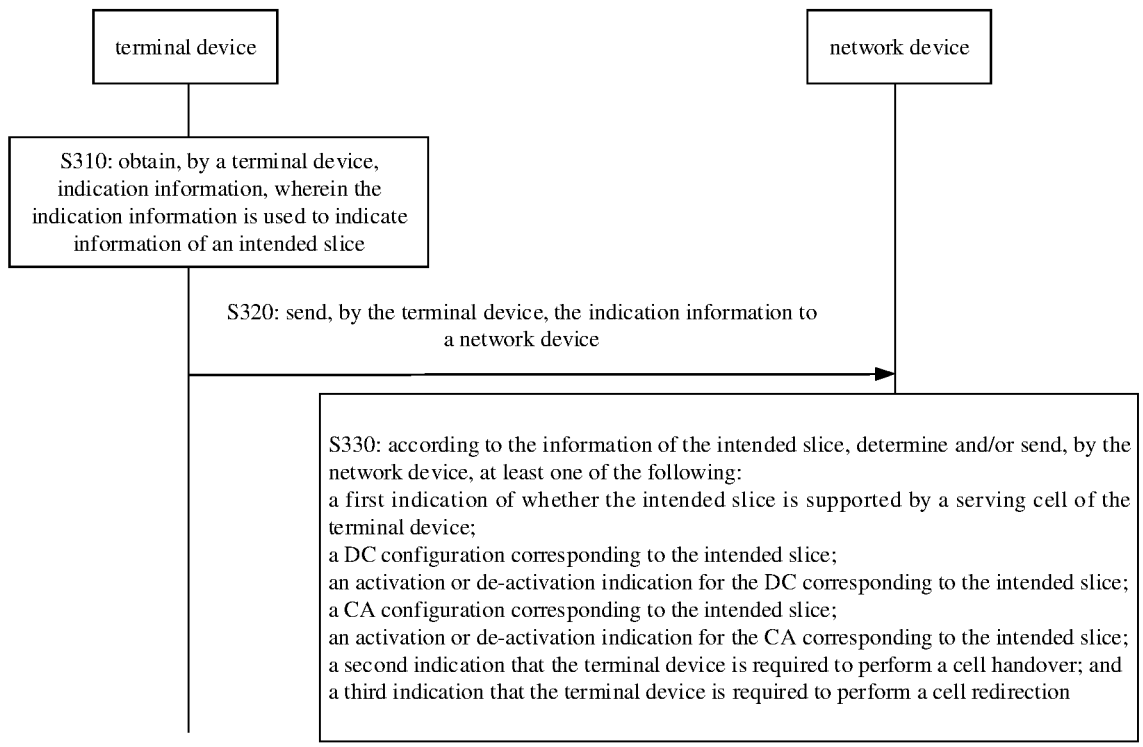
FIG. 3 is a flowchart of an interaction of a wireless communication method according to another embodiment of the present disclosure.

FIG. 3 is a flowchart showing interactions in a wireless communication method according to another embodiment of the present disclosure. The method includes the following steps.

In step S310, a terminal device obtains indication information. The indication information is used to indicate information of an intended slice.

In step S320, the terminal device sends the indication information to a network device.

In step S330, according to the information of the intended slice, the network device determines and/or sends at least one of the following: a first indication of whether the intended slice is supported by a serving cell of a terminal device; a Dual Connectivity (DC) configuration corresponding to the intended slice; an activation or de-activation indication for the DC corresponding to the intended slice; a Carrier Aggregation (CA) configuration corresponding to the intended slice; an activation or de-activation indication for the CA corresponding to the intended slice; a second indication that the terminal device is required to perform a cell handover; and a third indication that the terminal device is required to perform a cell redirection.

Optionally, this embodiment is applicable to a scenario where the terminal device is in the connected state, there is an uplink (UL) new service demand being triggered, or, there is a UL new service arrival, there is a downlink (DL) new service demand being triggered, or, there is a DL new service arrival, but is not limited to this. In such scenario(s), a new PDU session may be established to support the intended slice. The network device may also configure a Data Radio Bearer (DRB) for the terminal device through a RRC reconfiguration message.

The network device may broadcast information of at least one slice supported by the network device via a system message.

Regarding the information of the at least one slice supported by the network device, the information of a slice configured by the network device for the terminal device and the information of the intended slice, reference may be made to the corresponding embodiments in FIG. 2, and repeated descriptions are omitted here.

Optionally, the terminal device may select a cell corresponding to the slice configured for the terminal device by the network device to camp on. Further, the terminal device may establish a connection in the cell and perform service transmission.

Optionally, the terminal device may obtain the indication information by, but not limited to, the following manner(s): the indication information is generated by the NAS of the terminal device and sent to the AS of the terminal device; alternatively, the indication information is sent by the core network device to the terminal device via a NAS message.

Optionally, the core network device may be an AMF or other core network device, which is not limited in the present disclosure.

Optionally, the indication information is sent during a service request procedure, a PDU session establishment request procedure, a paging procedure, or a PDU session modification request procedure. Alternatively, the indication information is sent when a service arrives.

Optionally, the service may be a paging service or other data service, etc., and embodiments of the present disclosure do not impose specific limitations on this.

Optionally, for a case where the indication information is sent to the AS by the NAS of the terminal device, the NAS of the terminal device may send the indication information to the AS in any case, or may send the indication information when a certain condition is met.

Optionally, for a case where the indication information is sent by the core network device to the terminal device via a NAS message, the core network device may send the indication information to the terminal device in any case, or may send the indication information when a certain condition is met.

Optionally, the condition may be that the priority of the intended slice is higher than the priority of the slice currently configured, the current serving slice, or the currently established slice of the terminal device. Alternatively, the condition may be that the priority of the intended slice is not lower than the priority of the slice currently configured, the current serving slice, or the currently established slice of the terminal device.

Optionally, the indication information may be carried in a cause value.

Optionally, the cause value is any one of, but not limited to, the following: a RRC Establishment Cause, a RRC Reestablishment Cause, or a Cell Resume Cause.

Optionally, the terminal device may send the indication information to the network device via a dedicated message.

Optionally, the dedicated message is any one of the following: an RRC message, a Media Access Control Control Element (MAC CE), or Uplink Control Information (UCI).

Optionally, the terminal device may send the indication information to the network device in any case, or may send the indication information when a certain condition is met.

Optionally, the condition includes, but is not limited to, that: the serving cell of the terminal device or the frequency point of the serving cell cannot support both the current service of the terminal device and the service corresponding to the intended slice; and/or, the service corresponding to the intended slice has a higher priority than the priority of the current service; and/or, that the priority of the intended slice is not lower than the priority of the slice currently configured, the current serving slice or the currently established slice of the terminal device.

It is to be noted that, in addition to obtaining the information of the intended slice through the indication information, the information of the intended slice may also be pre-configured by the network device to the terminal device, and embodiments of the present disclosure do not impose specific limitations on this.

It should be noted that, regarding the manner of obtaining the indication information by the network device, in addition to obtaining the indication information from the terminal device, the network device may obtain the indication information from an application server. The application server may directly send the indication information to the network device, or the application server sends the indication information to the terminal device, and an application layer of the terminal device sends the indication information to the network device. In short, the present disclosure does not limit how the network device obtains the indication information.

Optionally, the indication information further includes first information. The first information is used to request at least one of the following: performing a cell handover; establishing a CA; establishing a DC; performing a cell redirection.

It is noted that the above indication information may not include the first information, i.e., there is no need for the terminal device to send at least one of the above requests to the network device.

Optionally, the network device may determine and/or send a first indication of whether the serving cell of the terminal device supports the intended slice according to the information of the serving cell of the terminal device and the information of intended slice.

Exemplarily, when the frequency point supported by the serving cell of the terminal device is A and the frequency point supported by the intended slice is B, and A and B are different, this indicates that the serving cell of the terminal device does not support the intended slice. In this case, the network device may determine and/or send the first indication described above.

Optionally, if the first indication indicates that the serving cell of the terminal device supports the intended slice, the terminal device carries out service transmission for intended slice in the serving cell. Conversely, if the network device determines that the serving cell of the terminal device does not support intended slice, the network device may determine whether it is needed to support the intended slice according to the information of the intended slice. For example, at least one of CA, DC, cell handover, and cell redirection is used to support the above-mentioned intended slice to achieve service transmission for the intended slice.

Optionally, the network device may determine whether it is needed to support the intended slice by, but not limited to, the following:

1. The network device determines whether it is needed to support the intended slice according to the priority of intended slice and the priority of the slice currently configured for the terminal device.

2. Or, the network device determines whether it is needed to support the intended slice according to the priority of the frequency point of the intended slice and the priority of the frequency point of the slice currently configured for the terminal device.

3. Or, if there is an in-service slice and the in-service slice and the intended slice cannot be supported at the same time, the network device determines whether it is needed to support the intended slice.

Description Regarding Point 1:

Optionally, if the priority of the intended slice is higher than the priority of the currently configured slice, the network device determines that the intended slice needs to be supported. If the priority of the intended slice is lower than or equal to the priority of the currently configured slice, the network device determines that support for intended slice is not required. Alternatively, if the priority of the intended slice is equal to or higher than the priority of the currently configured slice, the network device determines that the intended slice needs to be supported. If the priority of the intended slice is lower than the priority of the currently configured slice, the network device determines that support for intended slice is not required.

Description Regarding Point 2:

Optionally, if the priority of the frequency point of the intended slice is higher than the priority of the frequency point of the currently configured slice, the network device determines that the intended slice needs to be supported. If the priority of the frequency point of the intended slice is lower than or equal to the priority of the frequency point of the currently configured slice, the network device determines that support for intended slice is not required. Alternatively, if the priority of the frequency point of the intended slice is equal to or higher than the priority of the frequency point of the currently configured slice, the network device determines that the intended slice needs to be supported. If the priority of the frequency point of the intended slice is lower than the priority of the frequency point of the currently configured slice, the network device determines that support for intended slice is not required.
Description Regarding Point 3:

If there is an in-service slice and the in-service slice and the intended slice cannot be supported simultaneously, it is determined that the intended slice needs to be supported or the intended slice does not need to be supported.

Optionally, when the network device determines that the intended slice needs to be supported, the network device may, based on the information of the intended slice and the information of at least one slice supported by the serving cell, determines at least one of: a DC configuration corresponding to the intended slice, an activation or de-activation indication for the DC corresponding to the intended slice, a CA configuration, an activation or de-activation indication for the CA corresponding to the intended slice, performing a cell handover, and performing a cell handover.

It is noted that the information of at least one slice supported by the serving cell is also described as the information of at least one slice supported by the network device. Regarding the information of the at least one slice supported by the network device, reference can be made to the previous embodiments, and repeated descriptions are omitted here.

The following is an exemplary description of determination of at least one of a DC configuration corresponding to the intended slice, an activation or de-activation indication for a DC corresponding to the intended slice, a CA configuration, an activation or de-activation indication for a CA corresponding to the intended slice, performing a cell handover, and performing a cell handover by the network device based on the information of the intended slice and the information of at least one slice supported by the serving cell.

Example 1: When the frequency point supported by the serving cell of the terminal device is A and the frequency point supported by the intended slice is B, the network device may use a DC or CA technology for the serving cell and other cell(s), so that the frequency point corresponding to the terminal device may be B. This enables the service transmission for the intended slice.

Example 2: When the frequency point supported by the serving cell of the terminal device is A and the frequency point supported by the intended slice is B, if the network device determines that the frequency point supported by another cell is B, the network device indicates the terminal device to hand over to that cell, so that the frequency point corresponding to the terminal device may be B. In this way, the service transmission for the intended slice may be realized.

Optionally, the terminal device may send capability indication information to the network device. The capability indication information is used to indicate at least one of the following:
  1. whether the terminal device supports CA;
  2. whether the terminal device supports DC;
  3. at least one frequency point supported by the terminal device;
  4. at least one bandwidth supported by the terminal device;
  5. a combination or list of at least one bandwidth supported by the terminal device;
  6. a combination or list of at least one frequency point corresponding to at least one supported slice;
  7. a combination or list of at least one bandwidth corresponding to the at least one supported slice;
  8. a combination or list of at least one carrier corresponding to the at least one supported slice.

The list in item 5 is a list of at least one bandwidth combination supported by the terminal device. The list in item 6 is a list of at least one frequency point combination corresponding to the at least one slice supported by the terminal device. The list in item 7 is a list of at least one bandwidth combination corresponding to at least one slice supported by the terminal device. The list in item 8 is a list of at least one carrier combination corresponding to at least one slice supported by the terminal device.

Optionally, if the terminal device sends the capability indication information to the network device, then the network device may in step S330, based on the information of the intended slice, the information of at least one slice supported by the serving cell and the capability indication information of the terminal device, determine and/or send at least one of the following: the DC configuration corresponding to the intended slice; the activation or de-activation indication for the DC corresponding to the intended slice; the CA configuration corresponding to the intended slice; the activation or de-activation indication for the CA corresponding to the intended slice; the second indication that the terminal device is required to perform the cell handover; and the third indication that the terminal device is required to perform the cell redirection.

Exemplarily, when the frequency point supported by the serving cell of the terminal device is A and the frequency point supported by the intended slice is B, and the terminal device does not support the CA and DC technology but supports the cell handover technology, if the network device determines that the frequency point supported by another cell is B, the network device indicates the terminal device to hand over to that cell, so that the frequency point corresponding to the terminal device may be B. Thus, the service transmission for the intended slice can be realized.

Optionally, if the network device sends to the terminal device the DC configuration and/or CA configuration corresponding to the intended slice, and/or the activation or de-activation indication for the DC and/or CA corresponding to the intended slice, then the terminal device carries out the service transmission for the intended slice according to the DC configuration and/or CA configuration, and/or the activation or de-activation indication for the DC and/or CA corresponding to the intended slice.

Optionally, regarding the service transmission for the intended slice: if at least one of the cell(s) in the DC configuration and/or the CA configuration, and/or, determined according to the activation or de-activation indication for the DC and/or CA corresponding to the intended slice supports the intended slice, the terminal device performs the service transmission for intended slice on one of the at least one cell.

Optionally, regarding the service transmission for the intended slice and the transmission for the current service: if at least one of the cell(s) in the DC configuration and/or the CA configuration, and/or, determined according to the activation or de-activation indication for the DC and/or CA corresponding to the intended slice supports the intended slice and the current service of the terminal device, the terminal device performs both the service transmission for the intended slice and the transmission for the current service simultaneously on one of the at least one cell. For example, both the service transmission for the intended slice and the transmission for the current service are performed on cell 1. Alternatively, if at least one cell in the DC configuration and/or CA configuration supports the intended slice and the current service of the terminal device, the terminal device performs service transmission for the intended slice and transmission for the current service on at least two cells among the at least one cell, respectively. For example, the service transmission for the intended slice is performed on cell 1 and the transmission for the current service is performed on cell 2.

It should be noted that when the cell corresponding to the intended slice is in a de-activated state, the terminal device may perform at least one of the following: activate the cell; perform Timing Advance (TA) synchronization; and indicate to the network device that the cell needs to be activated.

Optionally, if the network device sends a second indication corresponding to the intended slice to the terminal device, the terminal device performs cell handover and/or service transmission for the intended slice according to the second indication.

Optionally, if the network device sends a third indication corresponding to the intended slice to the terminal device, the terminal device performs the cell redirection and/or performs the service transmission for the intended slice according to the third indication.

Optionally, the network device may in any case determine and/or send at least one of the following: the first indication of whether the terminal device's serving cell supports the intended slice; the DC configuration corresponding to the intended slice; the CA configuration corresponding to the intended slice; the activation or de-activation indication for the CA corresponding to the intended slice; the activation or de-activation indication for the DC corresponding to the intended slice; the second indication that the terminal device is required to perform cell handover; and the third indication that the terminal device is required to perform cell redirection. Alternatively, if a certain condition is met, the network device determines and/or sends at least one of the following: the first indication of whether the terminal device's serving cell supports the intended slice; the DC configuration corresponding to the intended slice; the CA configuration corresponding to the intended slice; the activation or de-activation indication for the CA corresponding to the intended slice; the activation or de-activation indication for the DC corresponding to the intended slice; the second indication that the terminal device is required to perform cell handover; and the third indication that the terminal device is required to perform cell redirection.

Optionally, the above condition may be that the serving cell of the terminal device or the frequency point of the serving cell cannot support both the current service of the terminal device and the service corresponding to the intended slice, and/or that the service corresponding to the intended slice has a higher priority than the priority of the current service, and/or that the priority of the intended slice is not lower than the priority of the currently configured slice, the current serving cell or currently established slice of the terminal device.

It is noted that in the present disclosure, the network device determines and/or sends at least one of the following: the first indication of whether the terminal device's serving cell supports the intended slice; the DC configuration corresponding to the intended slice; the CA configuration corresponding to the intended slice; the activation or de-activation indication for the CA corresponding to the intended slice; the activation or de-activation indication for the DC corresponding to the intended slice; the second indication that the terminal device is required to perform cell handover; and the third indication that the terminal device is required to perform cell redirection. The above may be performed independently, i.e., in a decoupled manner. For example, the network device does not need to first determine whether the serving cell of the terminal device supports the intended slice, and then determine the DC configuration, the CA configuration, cell handover, or cell redirection corresponding to the intended slice. For another example: the network device does not need to first determine whether to provide DC and/or CA configurations to the terminal device, and then determine whether to perform cell redirection or cell handover when it is determined that DC and/or CA configurations are not provided.

In summary, embodiments of the present disclosure provide the processing method of the terminal device when the terminal device obtains the information of the intended slice in a case where the terminal device in the connected state is currently configured with a slice. That is, the terminal device may send indication information to the network device. Further, the network device may determine and/or send at least one of the following based on the information of the intended slice indicated by the indication information: the first indication of whether the terminal device's serving cell supports the intended slice; the DC configuration corresponding to the intended slice; the CA configuration corresponding to the intended slice; the activation or de-activation indication for the CA corresponding to the intended slice; the activation or de-activation indication for the DC corresponding to the intended slice; the second indication that the terminal device is required to perform cell handover; and the third indication that the terminal device is required to perform cell redirection. Thus, the service transmission corresponding to the intended slice can be ensured.

The method embodiments of the present disclosure are described in detail above in conjunction with FIGS. 2 to 3, and the device embodiments of the present disclosure will be described in detail below in conjunction with FIGS. 4 to 9. It should be understood that the device embodiments and the method embodiments correspond to each other, and similar descriptions can be found in the previous descriptions regarding the method embodiments.

Figure 4:
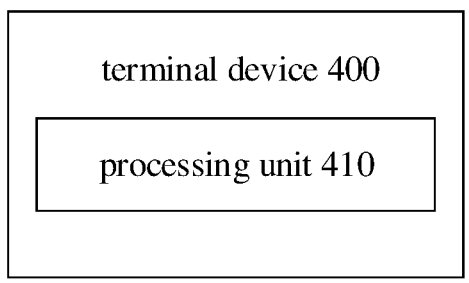
FIG. 4 illustrates a schematic block diagram of a terminal device 400 according to an embodiment of the present disclosure.

FIG. 4 illustrates a schematic block diagram of a terminal device 400 according to an embodiment of the present disclosure. As shown in FIG. 4, the terminal device 400 includes a processing unit 410 configured to: obtain indication information, wherein the indication information is used to indicate information of an intended slice; and according to the information of the intended slice, perform cell reselection or determine whether to trigger a connection establishment procedure in a serving cell of the terminal device.

Optionally, the indication information is generated by a Non-Access Stratum (NAS) of the terminal device and sent to an Access Stratum (AS) of the terminal device; or
  the indication information is sent by a core network device to the terminal device via a NAS message; or
  the indication information is sent by a network device to the terminal device.

Optionally, the indication information is carried in a paging message.

Optionally, the indication information is sent when a priority of the intended slice is higher than a priority of a slice currently configured for the terminal device, a serving slice of the terminal device, or a slice currently established for the terminal device.

Optionally, the indication information is sent during a service request procedure, a Packet Data Unit (PDU) session establishment request procedure, a paging procedure or a PDU session modification request procedure; or the indication information is sent upon service arrival.

Optionally, the indication information is carried in a cause value.

Optionally, the cause value is any one of the following: a Radio Resource Control (RRC) establishment cause, a RRC reestablishment cause, a cell reselection cause.

Optionally, the terminal device is in a non-connected state.

Optionally, the processing unit 410 is further configured to:
in response to that the terminal device is performing a cell reselection procedure, interrupt the cell reselection procedure.

Optionally, the processing unit 410 is further configured to:
trigger a connection establishment procedure in a reselected cell.

Optionally, the processing unit 410 is configured to perform at least one of the following:
in response to that it is determined that a cell corresponding to the intended slice is the serving cell according to the information of the intended slice, determining to trigger the connection establishment procedure in the serving cell of the terminal device;
in response to that it is determined that the cell corresponding to the intended slice is not the serving cell according to the information of the intended slice, determining not to trigger the connection establishment procedure in the serving cell of the terminal device; or
in response to that it is determined that the cell corresponding to the intended slice is not the serving cell according to the information of the intended slice, determining to trigger the connection establishment procedure in the serving cell of the terminal device and to perform only emergency service transmission.

Optionally, the processing unit 410 is configured to:
in response to that the serving cell of the terminal device or a frequency point of the serving cell cannot support a current service of the terminal device and a service corresponding to the intended slice simultaneously, and/or, a priority of the service corresponding to the intended slice is higher than a priority of the current service, performing a cell reselection or determining whether to trigger the connection establishment procedure in the serving cell of the terminal device according to the information of the intended slice.

Optionally, the information of the intended slice includes at least one of: an identity of the intended slice, a priority of the intended slice, information of a frequency point corresponding to the intended slice, and information of a cell corresponding to the intended slice.

Optionally, the information of the frequency point includes: an identity of the frequency point and/or a priority of the frequency point.

Optionally, in some embodiments, the communication unit may be a communication interface or a transceiver, or an input/output interface of a communication chip or a system on chip.

It should be understood that the terminal device 400 according to the embodiments of the present disclosure may correspond to the terminal device in the method embodiments corresponding to FIG. 2, and that the above and other operations and/or functions of the individual unit(s) in the terminal device 400 are respectively intended to implement the corresponding processes of the terminal device in the method embodiments corresponding to FIG. 2, and repeated description is omitted here for brevity.

Figure 5:
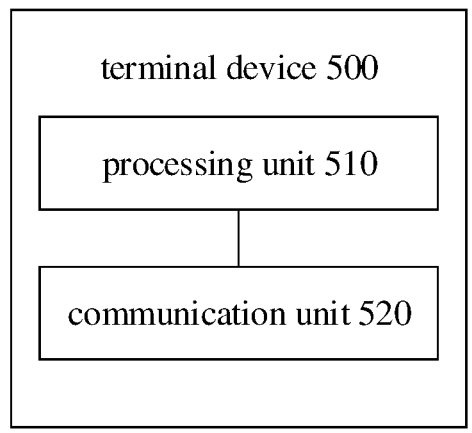
FIG. 5 illustrates a schematic block diagram of a terminal device 500 according to an embodiment of the present disclosure.

FIG. 5 illustrates a schematic block diagram of a terminal device 500 according to an embodiment of the present disclosure. As shown in FIG. 5, the terminal device 500 includes:
a processing unit 510 configured to obtain indication information, wherein the indication information is used to indicate information of an intended slice; and
a communication unit 520 configured to send the indication information to a network device.

Optionally, the indication information is generated by a Non-Access Stratum (NAS) of the terminal device and sent to an Access Stratum (AS) of the terminal device; or the indication information is sent by a core network device to the terminal device via a NAS message.

Optionally, the indication information is sent when a priority of the intended slice is higher than a priority of a slice currently configured for the terminal device, a serving slice of the terminal device, or a slice currently established for the terminal device.

Optionally, the indication information is sent during a service request procedure, a Packet Data Unit (PDU) session establishment request procedure, a paging procedure or a PDU session modification request procedure; or the indication information is sent upon service arrival.

Optionally, the indication information is carried in a cause value.

Optionally, the cause value is any one of the following: a Radio Resource Control (RRC) establishment cause, a RRC reestablishment cause, a cell reselection cause.

Optionally, the indication information is carried in a dedicated message.

Optionally, the dedicated message is any one of the following: an RRC message, a Media Access Control Control Element (MAC CE), and Uplink Control Information (UCI).

Optionally, the indication information further includes first information;
wherein the first information is used to request at least one of the following:
performing a cell handover;
establishing a Carrier Aggregation (CA);
establishing a Dual Connectivity (DC); and
performing a cell redirection.

Optionally, the communication unit 520 is further configured to:
send capability indication information to the network device;
wherein the capability indication information is used to indicate at least one of the following:
whether the terminal device supports CA;
whether the terminal device supports DC;
at least one frequency point supported by the terminal device;
at least one bandwidth supported by the terminal device;
a combination or list of at least one bandwidth supported by the terminal device;
a combination or list of at least one frequency point corresponding to at least one supported slice;
a combination or list of at least one bandwidth corresponding to the at least one supported slice;
a combination or list of at least one carrier corresponding to the at least one supported slice.

Optionally, the communication unit 520 is further configured to:
receive at least one of the following:
a first indication of whether the intended slice is supported by the serving cell of the terminal device;

a DC configuration corresponding to the intended slice;
an activation or de-activation indication for the DC corresponding to the intended slice;
a CA configuration corresponding to the intended slice;
an activation or de-activation indication for the CA corresponding to the intended slice;
a second indication that the terminal device is required to perform a cell handover; and
a third indication that the terminal device is required to perform a cell redirection.

Optionally, the processing unit 510 is further configured to:
in response to that the first indication indicates that the serving cell of the terminal device supports the intended slice, perform service transmission for the intended slice in the serving cell.

Optionally, the processing unit 510 is further configured to:
perform service transmission for the intended slice according to at least one of the DC configuration, the activation or de-activation indication for the DC corresponding to the intended slice, the CA configuration and the activation or de-activation indication for the CA corresponding to the intended slice.

Optionally, the processing unit 510 is configured to:
in response to that the intended slice is supported by at least one cell determined according to at least one of the DC configuration, the activation or de-activation indication for the DC corresponding to the intended slice, the CA configuration and the activation or de-activation indication for the CA corresponding to the intended slice, perform the service transmission for the intended slice on one of the at least one cell.

Optionally, the processing unit 510 is configured to:
in response to that the intended slice and a current service of the terminal device are supported by at least one cell determined according to at least one of the DC configuration, the activation or de-activation indication for the DC corresponding to the intended slice, the CA configuration and the activation or de-activation indication for the CA corresponding to the intended slice, perform the service transmission for the intended slice and transmission of the current service simultaneously on one of the at least one cell; or
in response to that the intended slice and the current service of the terminal device are supported by at least one cell determined according to at least one of the DC configuration, the activation or de-activation indication for the DC corresponding to the intended slice, the CA configuration and the activation or de-activation indication for the CA corresponding to the intended slice, perform the service transmission for the intended slice and transmission of the current service separately on at least two of the at least one cell.

Optionally, the processing unit 510 is further configured to:
according to the second indication, perform the cell handover, and/or perform a service transmission for the intended slice.

Optionally, the processing unit 510 is further configured to:
according to the third indication, perform the cell redirection, and/or performing a service transmission for the intended slice.

Optionally, the communication unit 520 is configured to:
send the indication information to the network device in response to that the serving cell of the terminal device or a frequency point of the serving cell cannot support a current service of the terminal device and a service corresponding to the intended slice simultaneously, and/or, a priority of the service corresponding to the intended slice is higher than a priority of the current service.

Optionally, the terminal device is in a connected state.

Optionally, the information of the intended slice includes at least one of: an identity of the intended slice, a priority of the intended slice, information of a frequency point corresponding to the intended slice, and information of a cell corresponding to the intended slice.

Optionally, the information of the frequency point includes: an identity of the frequency point and/or a priority of the frequency point.

Optionally, in some embodiments, the communication unit may be a communication interface or a transceiver, or an input/output interface of a communication chip or a system on chip.

It should be understood that the terminal device 500 according to the embodiments of the present disclosure may correspond to the terminal device in the method embodiments corresponding to FIG. 3, and that the above and other operations and/or functions of the individual unit(s) in the terminal device 500 are respectively intended to implement the corresponding processes of the terminal device in the method embodiments corresponding to FIG. 3, and repeated description is omitted here for brevity.

Figure 6:
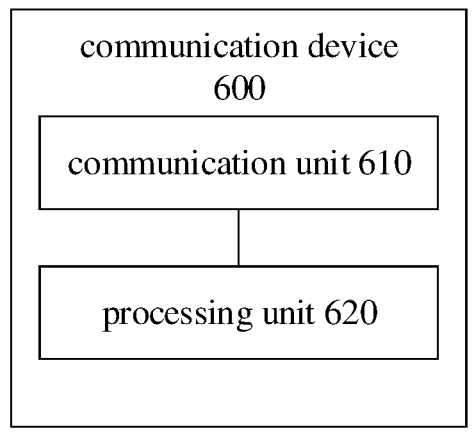
FIG. 6 illustrates a schematic block diagram of a network device 600 according to an embodiment of the present disclosure.

FIG. 6 illustrates a schematic block diagram of a network device 600 according to an embodiment of the present disclosure. As shown in FIG. 6, the network device includes: a communication unit 610 and a processing unit 620.

The communication unit 610 is configured to receive indication information, wherein the indication information is used to indicate information of an intended slice;

The processing unit 620 is configured to, according to the information of the intended slice, determine at least one of the following, and/or, the communication unit 610 is configured to send at least one of the following:
a first indication of whether the intended slice is supported by a serving cell of a terminal device;
a DC configuration corresponding to the intended slice;
an activation or de-activation indication for the DC corresponding to the intended slice;
a CA configuration corresponding to the intended slice;
an activation or de-activation indication for the CA corresponding to the intended slice;
a second indication that the terminal device is required to perform a cell handover; and
a third indication that the terminal device is required to perform a cell redirection.

Optionally, the indication information is from the terminal device.

Optionally, the indication information is generated by a Non-Access Stratum (NAS) of the terminal device and sent to an Access Stratum (AS) of the terminal device; or the indication information is sent by a core network device to the terminal device via a NAS message.

Optionally, the indication information is sent when a priority of the intended slice is higher than a priority of a slice currently configured for the terminal device, a serving slice of the terminal device, or a slice currently established for the terminal device.

Optionally, the indication information is sent during a service request procedure, a Packet Data Unit (PDU) session establishment request procedure, a paging procedure or a PDU session modification request procedure; or the indication information is sent upon service arrival.

Optionally, the indication information is carried in a cause value.

Optionally, the cause value is any one of the following: a Radio Resource Control (RRC) establishment cause, a RRC reestablishment cause, a cell reselection cause.

Optionally, the indication information is carried in a dedicated message.

Optionally, the dedicated message is any one of the following: an RRC message, a Media Access Control Control Element (MAC CE), and Uplink Control Information (UCI).

Optionally, the indication information is from an application server.

Optionally, the indication information further includes first information;
wherein the first information is used to request at least one of the following:
performing a cell handover;
establishing a Carrier Aggregation (CA);
establishing a Dual Connectivity (DC); and
performing a cell redirection.

Optionally, the communication unit 610 is further configured to:
send capability indication information to the terminal device;
wherein the capability indication information is used to indicate at least one of the following:
whether the terminal device supports CA;
whether the terminal device supports DC;
at least one frequency point supported by the terminal device;
at least one bandwidth supported by the terminal device;
a combination or list of at least one bandwidth supported by the terminal device;
a combination or list of at least one frequency point corresponding to at least one supported slice;
a combination or list of at least one bandwidth corresponding to the at least one supported slice;
a combination or list of at least one carrier corresponding to the at least one supported slice.

Optionally, the information of the intended slice includes at least one of: an identity of the intended slice, a priority of the intended slice, information of a frequency point corresponding to the intended slice, and information of a cell corresponding to the intended slice.

Optionally, the information of the frequency point includes: an identity of the frequency point and/or a priority of the frequency point.

Optionally, the processing unit 620 is configured to:
determine whether it is needed to support the intended slice according to a priority of the intended slice and a priority of a slice currently configured for the terminal device.

Optionally, the processing unit 620 is further configured to:
in response to that the priority of the intended slice is higher than the priority of the slice currently configured, determine that it is needed to support the intended slice; and
in response to that the priority of the intended slice is lower than or equal to the priority of the slice currently configured, determine that it is not needed to support the intended slice.

Optionally, the processing unit 620 is configured to:
determine, according to the information of the intended slice and information of at least one slice supported by the servicing cell, at least one of the DC configuration corresponding to the intended slice, the activation or de-activation indication for the DC corresponding to the intended slice, the CA configuration, the activation or de-activation indication for the CA corresponding to the intended slice, performing the cell handover, and performing the cell redirection.

Optionally, the processing unit 620 is configured to:
in response to that the serving cell of the terminal device or a frequency point of the serving cell cannot support a current service of the terminal device and a service corresponding to the intended slice simultaneously, and/or, a priority of the service corresponding to the intended slice is higher than a priority of the current service, determine, according to the indication information, at least one of:
the first indication of whether the intended slice is supported by the serving cell of the terminal device;
the DC configuration corresponding to the intended slice;
the activation or de-activation indication for the DC corresponding to the intended slice;
the CA configuration corresponding to the intended slice;
the activation or de-activation indication for the CA corresponding to the intended slice;
the second indication that the terminal device is required to perform the cell handover; and
the third indication that the terminal device is required to perform the cell redirection;
and/or the communication unit 610 is configured to:
in response to that the serving cell of the terminal device or a frequency point of the serving cell cannot support a current service of the terminal device and a service corresponding to the intended slice simultaneously, and/or, a priority of the service corresponding to the intended slice is higher than a priority of the current service, send, according to the indication information, at least one of:
the first indication of whether the intended slice is supported by the serving cell of the terminal device;
the DC configuration corresponding to the intended slice;
the activation or de-activation indication for the DC corresponding to the intended slice;
the CA configuration corresponding to the intended slice;
the activation or de-activation indication for the CA corresponding to the intended slice;
the second indication that the terminal device is required to perform the cell handover; and
the third indication that the terminal device is required to perform the cell redirection.

Optionally, the terminal device is in a connected state.

Optionally, in some embodiments, the communication unit may be a communication interface or a transceiver, or an input/output interface of a communication chip or a system on chip.

It should be understood that the network device 600 according to the embodiments of the present disclosure may correspond to the network device in the method embodiments corresponding to FIG. 2, and that the above and other operations and/or functions of the individual unit(s) in the network device 600 are respectively intended to implement the corresponding processes of the network device in the method embodiments corresponding to FIG. 2, and repeated description is omitted here for brevity.

Figure 7:
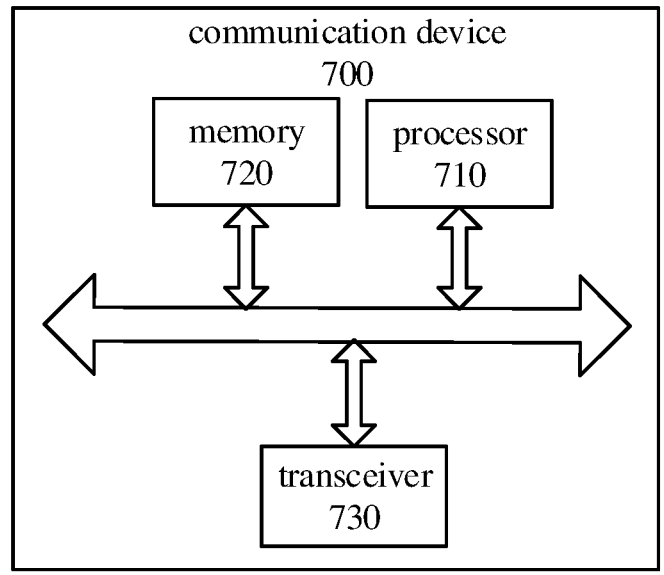
FIG. 7 is a schematic block diagram of a communication device 700 according to an embodiment of the present disclosure.

FIG. 7 is a schematic structural diagram of a communication device 700 according to an embodiment of the present disclosure. The communication device 700 shown in FIG. 7 includes a processor 710, and the processor 710 may call and run a computer program from a memory to perform the method in embodiments of the present disclosure.

Optionally, as shown in FIG. 7, the communication device 700 may further include a memory 720. The processor 710 may call and run a computer program from the memory 720 to perform the method in embodiments of the present disclosure.

The memory 720 may be a separate device independent of the processor 710, or may be integrated in the processor 710.

Optionally, as shown in FIG. 7, the communication device 700 may further include a transceiver 730, and the processor 710 may control the transceiver 730 to communicate with other devices. Specifically, the transceiver may send information or data to other devices, or receive information or data sent by other devices.

The transceiver 730 may include a transmitter and a receiver. The transceiver 630 may further include one or more antennas.

Optionally, the communication device 700 may specifically be the network device according to an embodiment of the present disclosure, and the communication device 700 may implement the corresponding processes implemented by the network device in the method embodiments of the present disclosure.

Optionally, the communication device 700 may specifically be the terminal device in embodiments of the present disclosure, and the communication device 700 may implement the corresponding processes implemented by the terminal device in the method embodiments of the present disclosure. For brevity, details are not repeated here.

Figure 8:
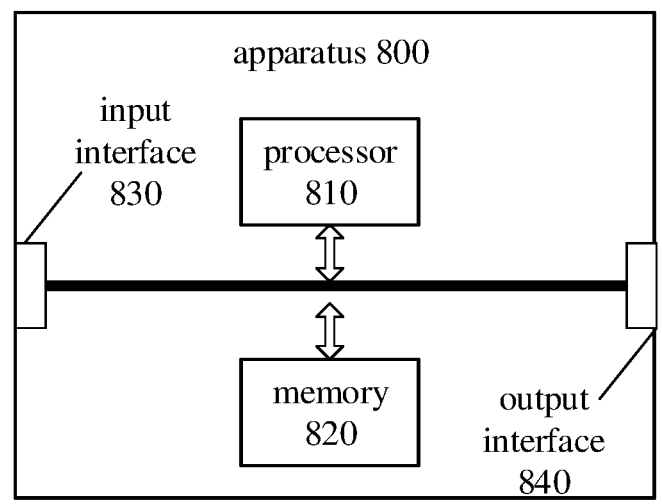
FIG. 8 is a schematic structural diagram of an apparatus according to an embodiment of the present disclosure.

FIG. 8 is a schematic structural diagram of an apparatus according to an embodiment of the present disclosure. The apparatus 800 shown in FIG. 8 includes a processor 810, and the processor 810 may call and run a computer program from a memory to implement the method according to embodiments of the present disclosure.

Optionally, as shown in FIG. 8, the apparatus 800 may further include a memory 820. The processor 810 may call and run a computer program from the memory 820 to implement the method according to embodiments of the present disclosure.

The memory 820 may be a separate device independent of the processor 810, or may be integrated in the processor 810.

Optionally, the apparatus 800 may further include an input interface 830. The processor 810 may control the input interface 830 to communicate with other apparatuses or chips, and specifically, the processor 810 may control the input interface to obtain information or data sent by other apparatuses or chips.

Optionally, the apparatus 800 may further include an output interface 840. The processor 810 may control the output interface 740 to communicate with other apparatuses or chips, and specifically, the processor 810 may control the output interface 840 to output information or data to other apparatuses or chips.

Optionally, the apparatus 800 may be applied to the network device in embodiments of the present disclosure, and the apparatus may implement the corresponding processes implemented by the network device in various methods according to embodiments of the present disclosure. For brevity, details are not repeated herein again.

Optionally, the apparatus may be applied to the terminal device in embodiments of the present disclosure, and the apparatus may implement the corresponding processes implemented by the terminal device in various methods according to embodiments of the present disclosure. For brevity, details are not repeated herein again.

Optionally, the apparatus in embodiments of the present disclosure may be a chip, which is for example, a system-level chip, a system chip, a chip system, or a system-on-chip, etc.

Figure 9:
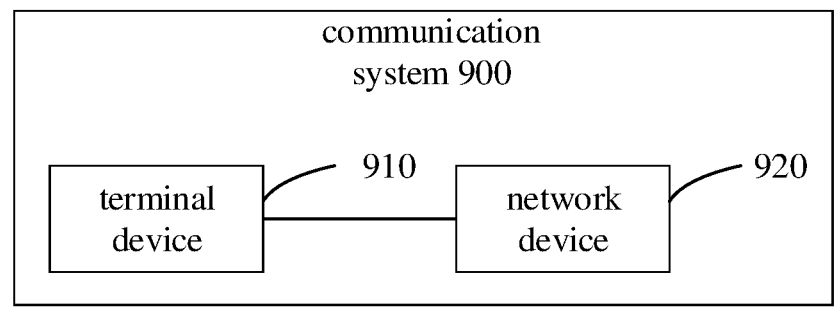
FIG. 9 is a schematic block diagram of a communication system 900 according to an embodiment of the present disclosure.

FIG. 9 is a schematic block diagram of a communication system 900 according to an embodiment of the present disclosure. As shown in FIG. 9, the communication system 900 includes a terminal device 910 and a network device 920.

The terminal device 910 may be used to implement the corresponding functions implemented by the terminal device in the above method embodiments, and the network device 920 may be used to implement the corresponding functions implemented by the network device or the base station in the above method embodiments. For the sake of brevity, repeated descriptions are omitted here.

It should be understood that the processor in embodiments of the present disclosure may be an integrated circuit chip with signal processing capability. In implementations, the steps of the foregoing method embodiments may be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure may be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module may be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory may be Read-Only Memory (ROM), Programmable ROM (PROM), Erasable PROM (EPROM), Electrically EPROM (EEPROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

Optionally, the computer-readable storage medium may be applied to the network device or a base station in embodiments of the present disclosure, and the computer programs cause a computer to perform the corresponding processes implemented by the network device or base station in each method embodiment of the present disclosure. For brevity, repeated descriptions are omitted here.

Optionally, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

Optionally, the computer program product may be applied to the network device or base station in embodiments of the present disclosure, and the computer program instructions cause a computer to perform the corresponding processes implemented by the network device or base station in each method embodiment of the present disclosure. For brevity, repeated descriptions are omitted here.

Optionally, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

Optionally, the computer program may be applied to the network device or base station in embodiments of the present disclosure, and when the computer program runs on a computer, the computer is caused to perform the corresponding processes implemented by the network device or base station in each method embodiment of the present disclosure. For brevity, repeated descriptions are omitted here.

Optionally, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art may use different methods to implement the described functions, but such implementation should not be considered as beyond the scope of the present disclosure.

It may be clearly understood by those skilled in the art that details of specific operation procedures of the systems, devices and units may be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A wireless communication method, comprising:
   obtaining, by a terminal device, indication information, wherein the indication information is used to indicate information of an intended slice, and wherein the indication information is sent by a core network device to the terminal device via a Non-Access Stratum (NAS) message; and according to the information of the intended slice, performing, by the terminal device, cell reselection;

wherein, prior to performing the cell reselection according to the information of the intended slice, the method further comprises:

in response to that the terminal device is currently performing a cell reselection procedure, interrupting, by the terminal device, the currently performed cell reselection procedure;

wherein the information of the intended slice comprises an identity of the intended slice and a priority of the intended slice.

2. The method according to claim 1, wherein the terminal device is in a non-connected state.

3. The method according to claim 1, wherein after performing cell reselection according to the information of the intended slice, the method further comprises:

triggering, by the terminal device, a connection establishment procedure in a reselected cell.

4. A terminal device, comprising:

a processor; and a memory storing instructions executable by the processor;

wherein when the instructions are executed by the processor, the terminal device is caused to:

obtain indication information, wherein the indication information is used to indicate information of an intended slice, and wherein the indication information is sent by a core network device to the terminal device via a Non-Access Stratum, NAS, message; and according to the information of the intended slice, perform cell reselection;

wherein when the instructions are executed by the processor, the terminal device is caused to:

prior to performing of the cell reselection according to the information of the intended slice, in response to that the terminal device is currently performing a cell reselection procedure, interrupt the currently performed cell reselection procedure;

wherein the information of the intended slice comprises an identity of the intended slice and a priority of the intended slice.

5. The terminal device according to claim 4, wherein the terminal device is in a non-connected state.

6. The terminal device according to claim 4, wherein when the instructions are executed by the processor, the terminal device is caused to:

trigger a connection establishment procedure in a reselected cell.

7. A network device, comprising:

a processor; and a memory storing instructions executable by the processor;

wherein when the instructions are executed by the processor, the network device is caused to:

send indication information to a terminal device via a Non-Access Stratum (NAS) message, wherein the indication information is used to indicate information of an intended slice, and the information of the intended slice is used for the terminal device to perform cell reselection, and prior to performing of the cell reselection according to the information of the intended slice, in response to that the terminal device is currently performing a cell reselection procedure, the terminal interrupts the currently performed cell reselection procedure;

wherein the information of the intended slice comprises an identity of the intended slice and a priority of the intended slice.

8. The network device according to claim 7, wherein the terminal device is in a non-connected state.

* * * * *